F. BEALS.
Rubber Plating.

No. 84,932.

Patented Dec. 15, 1868.

Witnesses.
M. Bailey
Wm. H. McCabe

Inventor.
Fordyce Beals
by
A. Pollok, his atty.

FORDYCE BEALS, OF NEW HAVEN, CONNECTICUT.

Letters Patent No. 84,932, dated December 15, 1868.

IMPROVEMENT IN PLATING SCALES WITH HARD RUBBER, FOR THE MANUFACTURE OF CUTLERY, AND FOR OTHER PURPOSES.

The Schedule referred to in these Letters Patent and making part of the same.

*To whom it may concern:*

Be it known that I, FORDYCE BEALS, of New Haven, in the county of New Haven, and State of Connecticut, have invented a certain new and improved Mode of Plating Scales with Vulcanite or Hard Rubber; and I hereby declare the following to be a full, clear, and exact description of the same, reference being had to the accompanying drawings, in which—

Figure 1:
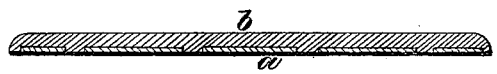
Figure 1 is a longitudinal section of a plated scale, made in accordance with my invention.
Figure 2:
Figure 2 is a transverse section of the same.
Figure 3:
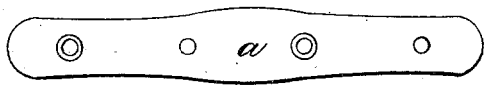
Figure 3 is a view of the metal scale with which the rubber is united.

The scales, which it is the object of my invention to produce, are designed for pocket-cutlery and like uses. Under my invention, vulcanized rubber, of the kind known as "hard rubber," is heated, and pressed upon a metal scale, of the form required, and into and through perforations made in said scale, so that the two materials will be united and held together solidly and firmly, without the aid of rivets, pins, or like devices.

To effect this result, a sheet of hard rubber or vulcanite is placed in a die of proper conformation, and upon it is placed the perforated metal scale. The two are then subjected to heat and pressure, as will be readily understood by manufacturers of vulcanized rubber, until the rubber is sufficiently softened to enter and pass through the perforations in the scale, and to take the impression and form of the die. After this, the plated scale can be removed from the die, and the rubber will be found to be perfectly formed and solidly united with the metal.

The perforations in the metal scale may be more or fewer in number, as desired, and can be made to taper from the reverse side of the scale, so that the rubber, when forced through, will spread, the head of the rubber pin thus formed being "upset," as it were, so as to fill the enlarged part of the perforations. It may also be desirable, at times, to roughen the face of the metal scale, to which the rubber is applied, in order to allow the latter material to take hold more firmly, although this is not indispensable.

The rubber may be heated and mollified either before or after the scale is applied to it. In some instances, also, I make the scale slightly smaller than the size required for the finished article, so that, when it is placed in the mould or die, and pressed with the rubber, the latter will cover and surround not only the face, but the edges of the metal, as shown in the drawings, where *a* represents the scale, and *b*, the vulcanite or hard rubber.

Having now described my invention, and the manner in which the same is or may be carried into effect,

What I claim, and desire to secure by Letters Patent, is—

1. As a new article of manufacture, a scale, plated with hard rubber, substantially as herein set forth.

2. The method of uniting the vulcanite or hard-rubber plate and metal scale, substantially in the manner and for the purposes described.

In testimony whereof, I have signed my name to this specification, before two subscribing witnesses.

FORDYCE BEALS.

Witnesses:
JOSEPH SHELDON,
J. A. WOOD.